United States Patent
Min et al.

(10) Patent No.: US 7,746,390 B2
(45) Date of Patent: Jun. 29, 2010

(54) METHOD AND DEVICE FOR PROCESSING PIXEL ARRAY DATA OF MOBILE TERMINAL EQUIPPED WITH DIGITAL CAMERA FUNCTION

(75) Inventors: Dong-Uk Min, Seoul (KR); Bo-Hong Seo, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 910 days.

(21) Appl. No.: 11/087,603

(22) Filed: Mar. 24, 2005

(65) Prior Publication Data
US 2005/0212926 A1  Sep. 29, 2005

(30) Foreign Application Priority Data
Mar. 27, 2004  (KR) ............ 10-2004-0021040

(51) Int. Cl.
*H04N 5/262*  (2006.01)
*H04N 5/225*  (2006.01)
*G06K 9/32*  (2006.01)

(52) U.S. Cl. .............. 348/240.2; 348/376; 382/300
(58) Field of Classification Search ......... 348/240.2
See application file for complete search history.

(56) References Cited

U.S. PATENT DOCUMENTS

| | | | | |
|---|---|---|---|---|
| 5,666,163 | A * | 9/1997 | Lee et al. ............ | 348/441 |
| 6,747,693 | B1 * | 6/2004 | Yamashita et al. ...... | 348/222.1 |
| 6,782,143 | B1 * | 8/2004 | Dube et al. ............ | 382/300 |
| 7,172,923 | B2 * | 2/2007 | Misawa ............... | 438/89 |
| 7,239,428 | B2 * | 7/2007 | Solecki ............... | 358/3.01 |
| 7,268,903 | B2 * | 9/2007 | Kojima et al. .......... | 358/1.15 |
| 2003/0012457 | A1 * | 1/2003 | Solecki .............. | 382/299 |
| 2003/0202113 | A1 * | 10/2003 | Yoshikawa ............ | 348/272 |
| 2005/0001855 | A1 * | 1/2005 | Kang ................ | 345/660 |
| 2005/0195424 | A1 * | 9/2005 | Kojima et al. .......... | 358/1.15 |

FOREIGN PATENT DOCUMENTS

JP  2000-261602  9/2000
KR  2002-0077793  10/2002

* cited by examiner

*Primary Examiner*—Sinh Tran
*Assistant Examiner*—Christopher K Peterson
(74) *Attorney, Agent, or Firm*—H.C. Park & Associates, PLC

(57) ABSTRACT

Disclosed is a technique for processing pixel array data of a mobile terminal with a digital camera function. A device for processing pixel array data includes: an image sensor having (x×y)-sized pixel capacity, converting an optical signal received via a lens into an electric signal, and generating (x×y)-sized pixel array data; and an image signal processor for generating an (X×Y)-sized extended pixel array data area, receiving pixel values of the (x×y)-sized pixel array data from the image sensor, arranging the pixel values of the (x×y)-sized pixel array data in the (X×Y)-sized extended pixel array data area, arranging pixel values obtained by performing an arithmetical operation on pixel values of (x×y)-sized pixel array data, adjacent to remaining pixel areas of the (X×Y)-sized extended pixel array data other than the pixel areas having the pixel values of the (x×y)-sized pixel array data, in the remaining pixel areas, and outputting the (X×Y)-sized extended pixel array data.

14 Claims, 6 Drawing Sheets

FIG.3

| A0 | B0 | C0 | D0 | E0 | F0 | G0 | H0 | I0 | J0 |
|----|----|----|----|----|----|----|----|----|----|
| A1 | B1 | C1 | D1 | E1 | F1 | G1 | H1 | I1 | J1 |
| A2 | B2 | C2 | D2 | E2 | F2 | G2 | H2 | I2 | J2 |
| A3 | B3 | C3 | D3 | E3 | F3 | G3 | H3 | I3 | J3 |
| A4 | B4 | C4 | D4 | E4 | F4 | G4 | H4 | I4 | J4 |
| A5 | B5 | C5 | D5 | E5 | F5 | G5 | H5 | I5 | J5 |
| A6 | B6 | C6 | D6 | E6 | F6 | G6 | H6 | I6 | J6 |
| A7 | B7 | C7 | D7 | E7 | F7 | G7 | H7 | I7 | J7 |
| A8 | B8 | C8 | D8 | E8 | F8 | G8 | H8 | I8 | J8 |
| A9 | B9 | C9 | D9 | E9 | F9 | G9 | H9 | I9 | J9 |

FIG.5

| | a0' | | b0' | | c0' | | d0' | | e0' | | f0' | | g0' | | h0' | | i0' | | i0' |
|---|---|---|---|---|---|---|---|---|---|---|---|---|---|---|---|---|---|---|---|
| A0 | A0' | B0 | B0' | C0 | C0' | D0 | D0' | E0 | E0' | F0 | F0' | G0 | G0' | H0 | H0' | I0' | I0" | J0' | J0" |
| | a1' | | b1' | | c1' | | d1' | | e1' | | f1' | | g1' | | h1' | | i0' | | i0' |
| A1 | A1' | B1 | B1' | C1 | C1' | D1 | D1' | E1 | E1' | F1 | F1' | G1 | G1' | H1 | H1' | I1' | I1" | J1' | J1" |
| | a2' | | b2' | | c2' | | d2' | | e2' | | f2' | | g2' | | h2' | | i0' | | i0' |
| A2 | A2' | B2 | B2' | C2 | C2' | D2 | D2' | E2 | E2' | F2 | F2' | G2 | G2' | H2 | H2' | I2' | I2" | J2' | J2" |
| | a3' | | b3' | | c3' | | d3' | | e3' | | f3' | | g3' | | h3' | | i0' | | i0' |
| A3 | A3' | B3 | B3' | C3 | C3' | D3 | D3' | E3 | E3' | F3 | F3' | G3 | G3' | H3 | H3' | I3' | I3" | J3' | J3" |
| | a4' | | b4' | | c4' | | d4' | | e4' | | f4' | | g4' | | h4' | | i0' | | i0' |
| A4 | A4' | B4 | B4' | C4 | C4' | D4 | D4' | E4 | E4' | F4 | F4' | G4 | G4' | H4 | H4' | I4' | I4" | J4' | J4" |
| | a5' | | b5' | | c5' | | d5' | | e5' | | f5' | | g5' | | h5' | | i0' | | i0' |
| A5 | A5' | B5 | B5' | C5 | C5' | D5 | D5' | E5 | E5' | F5 | F5' | G5 | G5' | H5 | H5' | I5' | I5" | J5' | J5" |
| | a6' | | b6' | | c6' | | d6' | | e6' | | f6' | | g6' | | h6' | | i0' | | i0' |
| A6 | A6' | B6 | B6' | C6 | C6' | D6 | D6' | E6 | E6' | F6 | F6' | G6 | G6' | H6 | H6' | I6' | I6" | J6' | J6" |
| | a7' | | b7' | | c7' | | d7' | | e7' | | f7' | | g7' | | h7' | | i0' | | i0' |
| A7 | A7' | B7 | B7' | C7 | C7' | D7 | D7' | E7 | E7' | F7 | F7' | G7 | G7' | H7 | H7' | I7' | I7" | J7' | J7" |
| | a8' | | b8' | | c8' | | d8' | | e8' | | f8' | | g8' | | h8' | | i0' | | i0' |
| A8 | A8' | B8 | B8' | C8 | C8' | D8 | D8' | E8 | E8' | F8 | F8' | G8 | G8' | H8 | H8' | I8' | I8" | J8' | J8" |
| | a9' | | b9' | | c9' | | d9' | | e9' | | f9' | | g9' | | h9' | | i0' | | i0' |
| A9 | A9' | B9 | B9' | C9 | C9' | D9 | D9' | E9 | E9' | F9 | F9' | G9 | G9' | H9 | H9' | I9' | I9" | J9' | J9" |

FIG.6

| A0 | A0' | B0 | B0' | C0 | C0' | D0 | D0' | E0 | E0' | F0 | F0' | G0 | G0' | H0 | H0' | I0 | I0' | J0 | J0' |
|---|---|---|---|---|---|---|---|---|---|---|---|---|---|---|---|---|---|---|---|
| A0' | A0" | B0' | B0" | C0' | C0" | D0' | D0" | E0' | E0" | F0' | F0" | G0' | G0" | H0' | H0" | I0' | I0" | J0' | J0" |
| A1 | A1' | B1 | B1' | C1 | C1' | D1 | D1' | E1 | E1' | F1 | F1' | G1 | G1' | H1 | H1' | I1 | I1' | J1 | J1' |
| A1' | A1" | B1' | B1" | C1' | C1" | D1' | D1" | E1' | E1" | F1' | F1" | G1' | G1" | H1' | H1" | I1' | I1" | J1' | J1" |
| A2 | A2' | B2 | B2' | C2 | C2' | D2 | D2' | E2 | E2' | F2 | F2' | G2 | G2' | H2 | H2' | I2 | I2' | J2 | J2' |
| A2' | A2" | B2' | B2" | C2' | C2" | D2' | D2" | E2' | E2" | F2' | F2" | G2' | G2" | H2' | H2" | I2' | I2" | J2' | J2" |
| A3 | A3' | B3 | B3' | C3 | C3' | D3 | D3' | E3 | E3' | F3 | F3' | G3 | G3' | H3 | H3' | I3 | I3' | J3 | J3' |
| A3' | A3" | B3' | B3" | C2' | C3" | D3' | D3" | E3' | E3" | F3' | F3" | G3' | G3" | H3' | H3" | I3' | I3" | J3' | J3" |
| A4 | A4' | B4 | B4' | C4 | C4' | D4 | D4' | E4 | E4' | F4 | F4' | G4 | G4' | H4 | H4' | I4 | I4' | J4 | J4' |
| A4' | A4" | B4' | B4" | C4' | C4" | D4' | D4" | E4' | E4" | F4' | F4" | G4' | G4" | H4' | H4" | I4' | I4" | J4' | J4" |
| A5 | A5' | B5 | B5' | C5 | C5' | D5 | D5' | E5 | E5' | F5 | F5' | G5 | G5' | H5 | H5' | I5 | I5' | J5 | J5' |
| A5' | A5" | B5' | B5" | C5' | C5" | D5' | D5" | E5' | E5" | F5' | F5" | G5' | G5" | H5' | H5" | I5' | I5" | J5' | J5" |
| A6 | A6' | B6 | B6' | C6 | C6' | D6 | D6' | E6 | E6' | F6 | F6' | G6 | G6' | H6 | H6' | I6 | I6' | J6 | J6' |
| A6' | A6" | B6' | B6" | C6' | C6" | D6' | D6" | E6' | E6" | F6' | F6" | G6' | G6" | H6' | H6" | I6' | I6" | J6' | J6" |
| A7 | A7' | B7 | B7' | C7 | C7' | D7 | D7' | E7 | E7' | F7 | F7' | G7 | G7' | H7 | H7' | I7 | I7' | J7 | J7' |
| A7' | A7" | B7' | B7" | C7' | C7" | D7' | D7" | E7' | E7" | F7' | F7" | G7' | G7" | H7' | H7" | I7' | I7" | J7' | J7" |
| A8 | A8' | B8 | B8' | C8 | C8' | D8 | D8' | E8 | E8' | F8 | F8' | G8 | G8' | H8 | H8' | I8 | I8' | J8 | J8' |
| A8' | A8" | B8' | B8" | C8' | C8" | D8' | D8" | E8' | E8" | F8' | F8" | G8' | G8" | H8' | H8" | I8' | I8" | J8' | J8" |
| A9 | A9' | B9 | B9' | C9 | C9' | D9 | D9' | E9 | E9' | F9 | F9' | G9 | G9' | H9 | H9' | I9 | I9' | J9 | J9' |
| A9' | A9" | B9' | B9" | C9' | C9" | D9' | D9" | E9' | E9" | F9' | F9" | G9' | G9" | H9' | H9" | I9' | I9" | J9' | J9" |

METHOD AND DEVICE FOR PROCESSING PIXEL ARRAY DATA OF MOBILE TERMINAL EQUIPPED WITH DIGITAL CAMERA FUNCTION

This application claims the priority of Korean Patent Application No. 2004-21040, filed on Mar. 27, 2004, in the Korean Intellectual Property Office, the disclosure of which is incorporated herein in its entirety by reference.

BACKGROUND OF THE INVENTION

1. Field of the Invention

The present invention relates to a mobile terminal equipped with a digital camera function and, more particularly, to a technique for processing pixel array data in a mobile terminal.

2. Description of the Related Art

In general, a portable electronic device, such as mobile communication terminal, digital camera, or personal digital assistant (PDA), equipped with a digital camera function includes an image sensor. As well known in the art, the image sensor contains a grid of photosensitive diodes called photosites. Each photosite records the intensity or brightness of light that falls on it by accumulating electrical charges. That is, each photosite transforms the light falling on it into electrical charges. The image sensor generates pixel array data on the basis of the position of individual pixels and the magnitude of electrical charges or voltage.

The image sensor has a fixed pixel size by its hardware structure. An image sensor for use in a typical mobile communication terminal has a pixel capacity of 1.3M (i.e., 1280×960).

A digital image captured by the mobile communication terminal may be transferred and stored in an external device such as a personal computer (PC), so that it can be displayed by the external device. However, an image sensor for use in a mobile communication terminal having a digital camera function has a relatively small pixel capacity. When any digital image is enlarged enough, pixels will begin to show—an effect called pixelization.

On the other hand, there has been recently proposed an improved digital camera technology of enlarging an image captured by the digital camera by software interpolation. However, the above-mentioned technology has a disadvantage in that the pixel array data generated from an image sensor has a fixed pixel size. Further, the above-mentioned technology uses, as source data, pixel array data with a smaller pixel size compared to that needed for the enlarged image, and enlarges the pixel array data by software only, such that the resolution of the enlarged image is markedly reduced.

SUMMARY OF THE INVENTION

The present invention provides a method of processing pixel array data in a mobile terminal equipped with a camera function, in which (X×Y)-sized extended pixel array data (where x×n=X and y×n=Y, n=natural number greater than 1) is physically generated instead of (x×y)-sized pixel array data generated from an image sensor having fixed-sized pixel capacity, and the (X×Y)-sized extended pixel array data is processed (i.e., displayed on a display, encoded, transmitted to an external device, etc.) instead of processing the (x×y)-sized pixel array data.

In accordance with an aspect of the present invention, there is provided a device for processing pixel array data in a mobile terminal equipped with a digital camera function, the device comprising: an image sensor having (x×y)-sized pixel capacity, converting an optical signal received via a lens into an electric signal, and generating (x×y)-sized pixel array data; and an image signal processor for generating an (X×Y)-sized extended pixel array data area satisfying a predetermined condition of x×n=X and y×n=Y (where n=natural number greater than 1), receiving individual pixel values of the (x×y)-sized pixel array data from the image sensor, arranging the pixel values of the (x×y)-sized pixel array data in the (X×Y)-sized extended pixel array data area while simultaneously arranging the pixel values of the (x×y)-sized pixel array data to be spaced apart from each other by a predetermined pixel size of (n−1), arranging corresponding pixel values obtained by performing an arithmetical operation on corresponding pixel values of (x×y)-sized pixel array data, which are adjacent to remaining pixel areas of the (X×Y)-sized extended pixel array data other than the pixel areas having the pixel values of the (x×y)-sized pixel array data, in the remaining pixel areas, and outputting the (X×Y)-sized extended pixel array data in which the pixel values are arranged in the respective pixel areas so that the (X×Y)-sized extended pixel array data can be displayed.

The mobile terminal equipped with a digital camera function may be a mobile communication terminal or a digital camera.

The device may further comprise an image encoder for encoding the (X×Y)-sized extended pixel array data in which corresponding pixel values are arranged in the pixel areas, and an external communication port for transmitting the encoded (X×Y)-sized extended pixel array data to an external device.

The image signal processor may perform well-known digital signal processing operations including at least one of white balance adjusting, auto-focus adjusting, and dead pixel recovering operations on the (X×Y)-sized extended pixel array data in which pixel values are arranged in the pixel areas.

The image signal processor may receive the (x×y)-sized pixel array data from the image sensor, perform well-known digital signal processing operations including at least one of white balance adjusting, auto-focus adjusting, and dead pixel recovering operations on the received (x×y)-sized pixel array data, and perform the arranging and outputting operations.

The image signal processor may differently arrange pixel values in the remaining pixel areas according to the following three cases when the value of n is 2, wherein in the first case where (x×y)-sized pixel values are arranged to be vertically adjacent to each of corresponding pixel areas contained in the remaining pixel areas, a mean value of the two vertically adjacent pixel values is arranged in each of the corresponding pixel areas; in the second case where (x×y)-sized pixel values are arranged to be horizontally adjacent to each of corresponding pixel areas contained in the remaining pixel areas, a mean value of the two horizontally adjacent pixel values is arranged in each of the corresponding pixel areas; and in the third case where (x×y)-sized pixel values are arranged in four directions (i.e., upper-left side, lower-left side, upper-right side, and lower-right side) to be adjacent to a corresponding pixel area contained in the remaining pixel areas, a mean value obtained by dividing by 4 the sum of a mean value of upper-left and upper-right (x×y)-sized pixel values, a mean value of upper-left and lower-left (x×y)-sized pixel values, a mean value of lower-left and lower-right (x×y)-sized pixel values, and a mean value of lower-right and upper-right (x×y)-sized pixel values is arranged in the corresponding pixel area.

In accordance with an aspect of the present invention, there is provided a method of processing pixel array data in a mobile terminal equipped with a digital camera function, the method comprising the steps of: a) generating, by an image signal processor, an (X×Y)-sized extended pixel array data area satisfying a predetermined condition of x×n=X and y×n=Y (where n=natural number greater than 1), receiving individual pixel values of the (x×y)-sized pixel array data from the image sensor, arranging the pixel values of the (x×y)-sized pixel array data in the (X×Y)-sized extended pixel array data area while simultaneously arranging the pixel values of the (x×y)-sized pixel array data to be spaced apart from each other by a predetermined pixel size of (n−1); b) arranging, by the image signal processor, corresponding pixel values obtained by performing an arithmetical operation on corresponding pixel values of (x×y)-sized pixel array data, which are adjacent to remaining pixel areas of the (X×Y)-sized extended pixel array data other than the pixel areas having the pixel values of the (x×y)-sized pixel array data, in the remaining pixel areas; and c) outputting, by the image signal processor, the (X×Y)-sized extended pixel array data in which the pixel values are arranged in the respective pixel areas so that the (X×Y)-sized extended pixel array data can be displayed.

The method may further comprise the steps of: encoding, by an image encoder, the (X×Y)-sized extended pixel array data in which corresponding pixel values are arranged in the pixel areas; and transmitting, by an external communication port, the encoded (X×Y)-sized extended pixel array data to an external device.

The step (b) may include differently arranging, by the image signal processor, pixel values in the remaining pixel areas according to the following three cases when the value of n is 2, wherein in the first case where (x×y)-sized pixel values are arranged to be vertically adjacent to each of corresponding pixel areas contained in the remaining pixel areas, a mean value of the two vertically adjacent pixel values is arranged in each of the corresponding pixel areas; in the second case where (x×y)-sized pixel values are arranged to be horizontally adjacent to each of corresponding pixel areas contained in the remaining pixel areas, a mean value of the two horizontally adjacent pixel values is arranged in each of the corresponding pixel areas; and in the third case where (x×y)-sized pixel values are arranged in four directions (i.e., upper-left side, lower-left side, upper-right side, and lower-right side) to be adjacent to a corresponding pixel area contained in the remaining pixel areas, a mean value obtained by dividing by 4 the sum of a mean value of upper-left and upper-right (x×y)-sized pixel values, a mean value of upper-left and lower-left (x×y)-sized pixel values, a mean value of lower-left and lower-right (x×y)-sized pixel values, and a mean value of lower-right and upper-right (x×y)-sized pixel values is arranged in the corresponding pixel area.

The method may further comprise performing, by the image signal processor, well-known digital signal processing operations including at least one of white balance adjusting, auto-focus adjusting, and dead pixel recovering operations on the (X×Y)-sized extended pixel array data in which pixel values are arranged in the pixel areas.

The method may further comprise the steps of: receiving, by the image signal processor, the (x×y)-sized pixel array data from the image sensor and performing well-known digital signal processing operations including at least one of white balance adjusting, auto-focus adjusting, and dead pixel recovering operations on the received (x×y)-sized pixel array data; and performing the arranging and outputting operations.

BRIEF DESCRIPTION OF THE DRAWINGS

The above and other features and advantages of the present invention will become more apparent by describing in detail exemplary embodiments thereof with reference to the attached drawings in which:

FIG. 3 is a view showing an example of (x×y)-sized pixel array data;

FIG. 5 is a view showing an example in which pixel values obtained by performing an arithmetical operation on neighboring (x×y)-sized pixel values are arranged in the remaining pixel areas of (X×Y)-sized extended pixel array data other than the pixel areas in which the pixel values of the (x×y)-sized pixel array data are arranged; and FIG. 6 is a view showing an example of (X×Y)-sized extended pixel array data.

DETAILED DESCRIPTION OF THE PREFERRED EMBODIMENTS

Exemplary embodiments in accordance with the present invention will now be described in detail with reference to the accompanying drawings.

Figure 1:
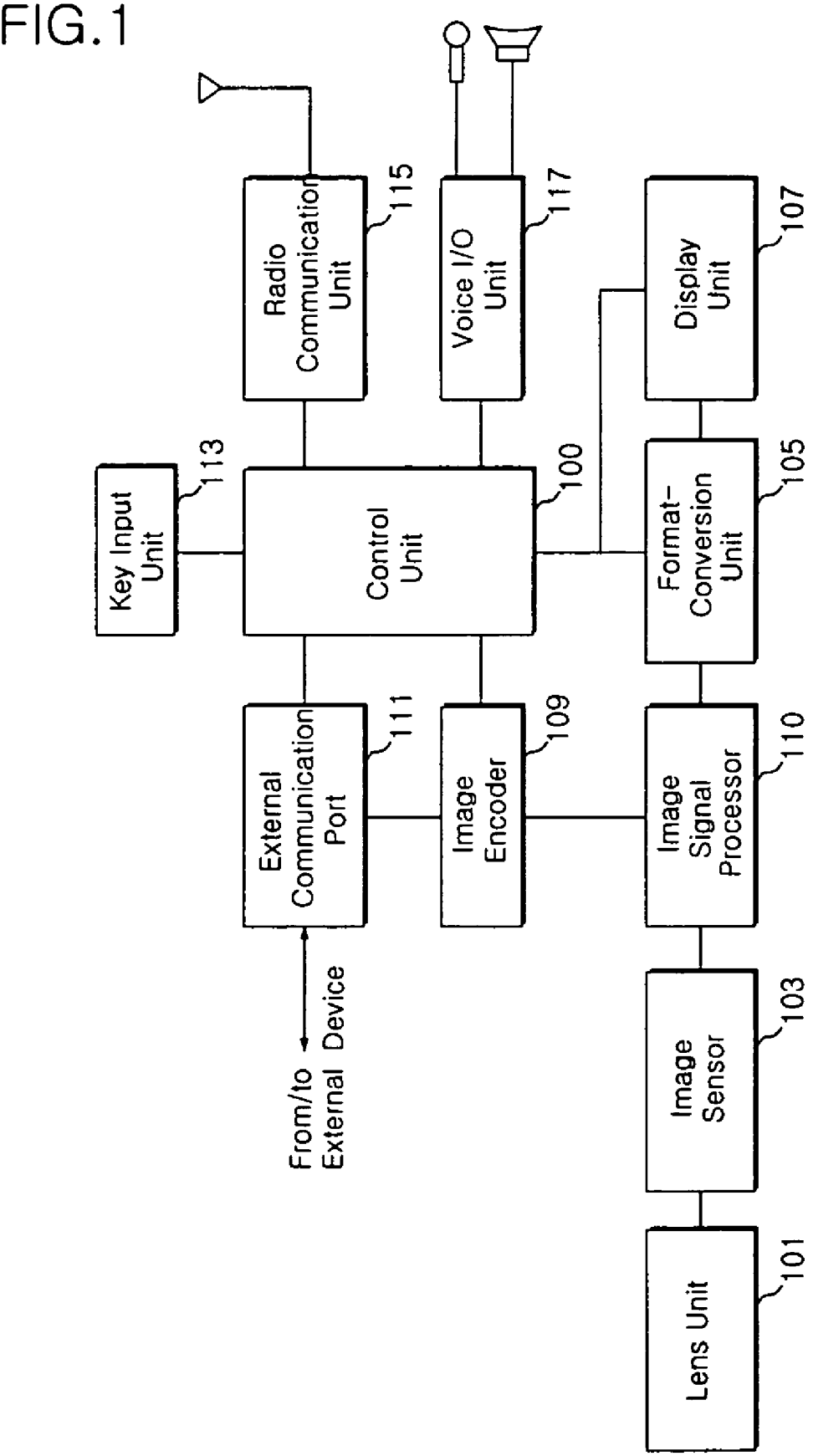
FIG. 1 is a block diagram showing a configuration of a mobile communication terminal employing the present invention.

FIG. 1 is a block diagram showing a configuration of a mobile communication terminal employing the present invention.

The mobile communication terminal includes a control unit 100, peripheral units 107, 111, 113, 115, and 117, and camera function units 101, 103, 110, 105, and 109.

The peripheral units include a key input unit 113, an external communication port 111, a display unit 107 for displaying menus and operation states, a radio communication unit 115 for extracting voice and data signals from radio signals transmitted/received via an antenna, and a voice input/output (I/O) unit 117 for inputting/outputting the voice signals from the radio communication unit 115 using a microphone or a speaker.

The key input unit 113 and the display unit 107 which is comprised of a liquid crystal display (LCD) or a light emitting diode (LED) output unit are well known in the art. The radio communication unit 115 includes an antenna and a radio frequency (RF) module for communicating with a base station. It should be noted that the radio communication unit 115 is intended to be available in currently developed mobile communication systems such as CDMA, GSM, and PDC, and other mobile communication systems to be developed in the future. As well known in the art, the voice I/O unit 117 includes supplementary circuits such as an audio amplifier or a filter, and converts digital voice data into analog voice data or vice versa.

A baseband circuit of the radio communication unit 115 and most circuits of the control unit 100 are integrated into a commercially available single chip. This IC chip, which is usually called a mobile station modem (MSM) chip, includes a hardware dedicated for communication processing, a digital signal processor, and a general-purpose microprocessor. Logically, the IC chip includes a communication processing unit for processing voice and data communications, and a system control unit for controlling the overall system according to operating states or signals inputted from a key input unit.

A lens unit 101 receives an optical signal. An image sensor 103 converts the optical signal received from the lens unit 101 into an electrical signal and outputs predetermined pixel array data. A capacitor and a transistor which are provided in each pixel act to store the electrical charges. The image sensor 103 generates pixel array data using the position of individual pixels and the magnitude of electrical charges or voltage.

Typically, an image signal processor 110 receives pixel array data from the image sensor 103, and performs digital signal processing operations on the received pixel array data to adjust white balance, adjust auto-focus, recover specific pixel data and the like.

The display unit 107 displays the above-mentioned digitally signal processed image. When the display unit 107 does not support a data format (e.g., YUV format) generated from the image signal processor 110, a format-conversion unit 105 converts the data format into a format (e.g., RGB format) supported by the display unit 107.

Figure 2:
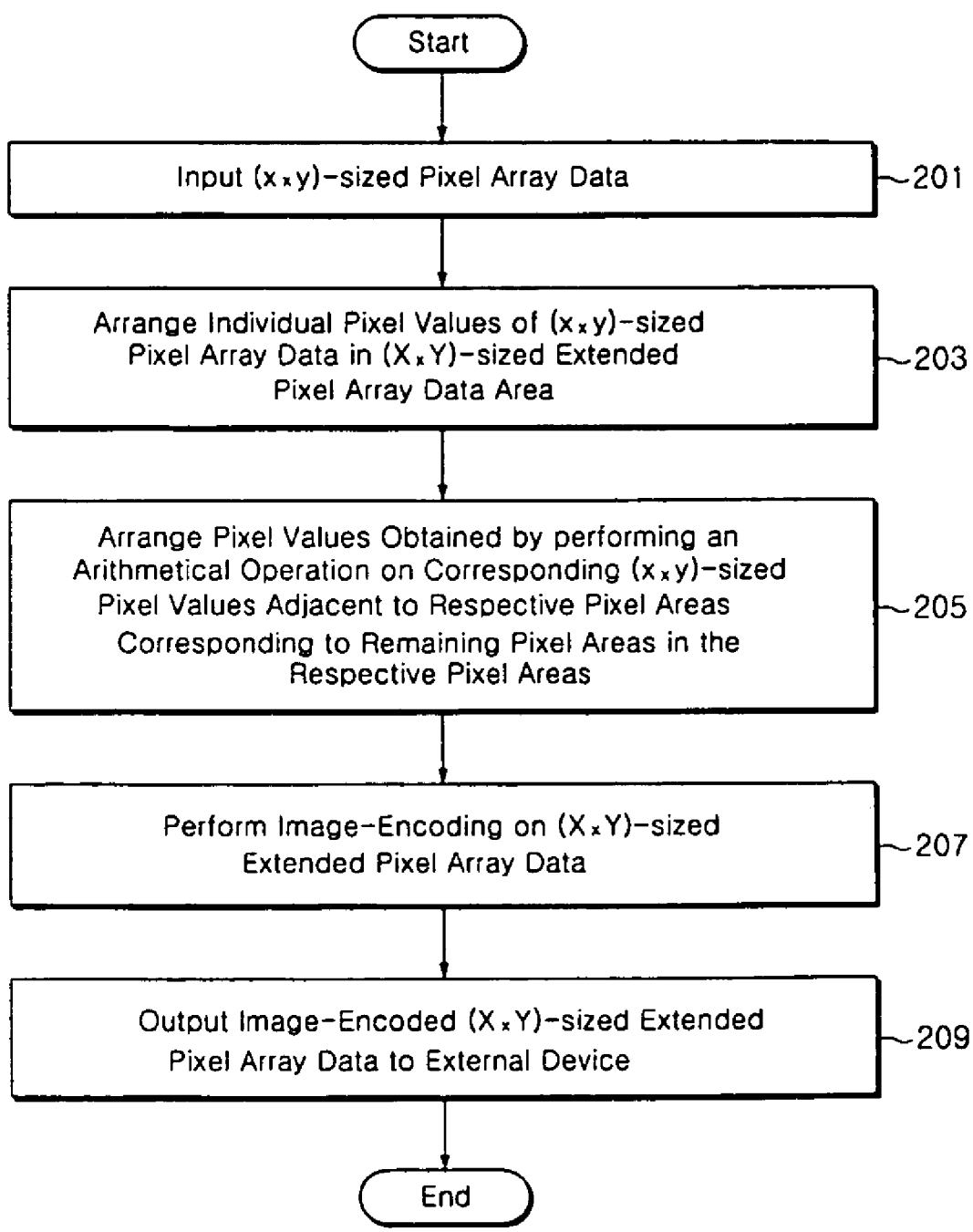
FIG. 2 is a flow chart showing a method of processing pixel array data in accordance with a preferred embodiment of the present invention.
Figure 4:
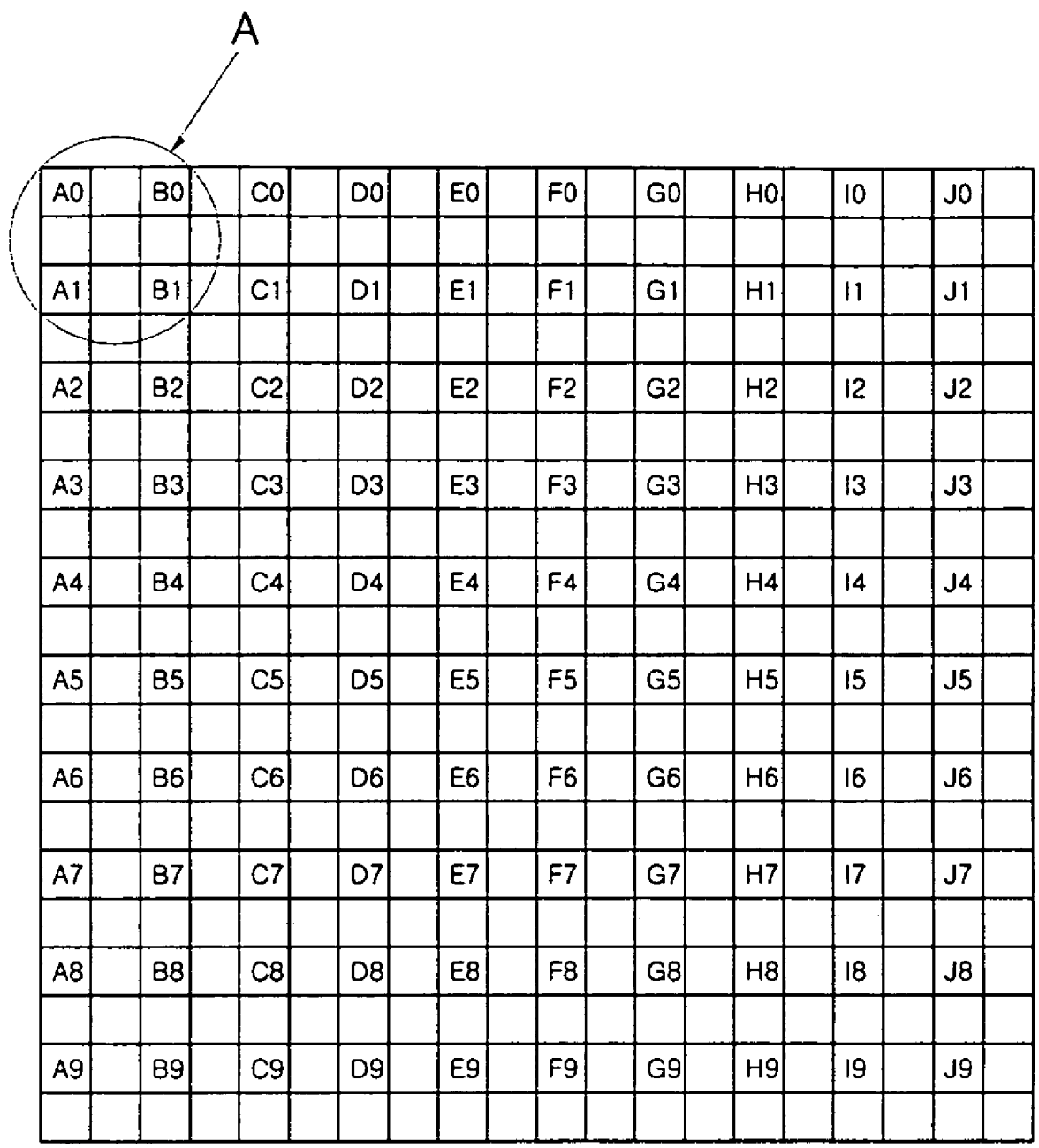
FIG. 4 is a view showing an example in which pixel values of (x×y)-sized pixel array data are arranged in corresponding pixel areas for (X×Y)-sized extended pixel array data.

FIG. 2 is a flow chart showing a method of processing pixel array data in accordance with a preferred embodiment of the present invention. FIG. 3 is a view showing an example of (x×y)-sized pixel array data. FIG. 4 is a view showing an example in which pixel values of (x×y)-sized pixel array data are arranged in pixel areas for (X×Y)-sized extended pixel array data. FIG. 5 is a view showing an example in which pixel values obtained by performing an arithmetical operation on neighboring (x×y)-sized pixel values are arranged in the remaining pixel areas of (X×Y)-sized extended pixel array data other than the pixel areas in which the pixel values of the (x×y)-sized pixel array data are arranged. FIG. 6 is a view showing an example of (X×Y)-sized extended pixel array data.

In accordance with a preferred embodiment of the present invention, as shown in FIG. 2, a method of processing pixel array data in a mobile terminal equipped with a digital camera function comprises the steps of: a) generating, by an image signal processor 110, an (X×Y)-sized extended pixel array data area satisfying a predetermined condition of x×n=X and y×n=Y (where n=natural number greater than 1), receiving individual pixel values of the (x×y)-sized pixel array data from the image sensor 103 (step 201), arranging the pixel values of the (x×y)-sized pixel array data in the (X×Y)-sized extended pixel array data area while simultaneously arranging the pixel values of the (x×y)-sized pixel array data to be spaced apart from each other by a predetermined pixel size of (n–1) (step 203); b) arranging, by the image signal processor 110, corresponding pixel values obtained by performing an arithmetical operation on corresponding pixel values of (x×y)-sized pixel array data, which are adjacent to remaining pixel areas of the (X×Y)-sized extended pixel array data other than the pixel areas having the pixel values of the (x×y)-sized pixel array data, in the remaining pixel areas (step 205); and c) outputting, by the image signal processor 110, the (X×Y)-sized extended pixel array data in which the pixel values are arranged in the respective pixel areas so that the (X×Y)-sized extended pixel array data can be displayed (not shown in FIG. 2).

For convenience of description and better understanding of the present invention, it is assumed that the pixel array data generated from the image sensor 103 has a (x×y) pixel size. In the example of FIG. 3, the pixel array data has 10 pixels in x-column and 10 pixels in y-row, and predetermined pixel values A0 to J9 are set to individual pixel areas.

For convenience of description, it is assumed that the pixel array data is extended to have a (X×Y) pixel size by the image signal processor 110. In this case, it is preferable that the relation between x and X is defined by x×n=X (where n=natural number greater than "1"), and the relation between y and Y is defined by y×n=Y (where n=natural number greater than "1"). In the examples of FIGS. 4 to 6, the pixel array data has 20 pixels in X-column and 20 pixels in Y-row, and predetermined pixel values A0 to J9' are set to individual pixel areas.

The image signal processor 110 generates an (X×Y)-sized extended pixel array data area in which the relations between x and X and between y and Y are defined by x×n=X and y×n=Y (where n=natural number greater than 1).

Upon receiving the (x×y)-sized pixel array data from the image sensor 103 (step 201), the image signal processor 110 arranges individual pixel values of the (x×y)-sized pixel array data in the (X×Y)-sized extended pixel array data area (step 203). In this case, the received pixel values are spaced apart from each other by a pixel size of (n--1). In the example of FIG. 4, dummy pixel areas are arranged so that individual pixel areas in which the above-mentioned pixel values are arranged are spaced apart from each other by a single pixel area.

For example, if n is 2, a pixel capacity of an original image is enlarged four times. If n is 3, a pixel capacity of an original image is enlarged nine times.

The image signal processor 110 arranges corresponding pixel values in the remaining pixel areas (of the (X×Y)-sized extended pixel array data) other than the above-mentioned pixel areas in which the pixel values of the (x×y)-sized pixel array data are arranged. In this case, the image signal processor 110 arranges pixel values obtained by performing an arithmetical operation on corresponding (x×y)-sized pixel values adjacent to the above-mentioned individual remaining pixel areas in the individual remaining pixel areas (step 205). In the example of FIG. 5, the resultant pixel values are arranged in dummy pixel areas shown in FIG. 4.

In more detail, the image signal processor 110 arranges corresponding pixel values obtained by performing an arithmetical operation on at least two values of the (x×y)-sized pixel array data in the above-mentioned remaining pixel areas. As a method of obtaining the corresponding pixel values, a well-known pixel reconstruction technique typically used in the image signal processor 110 can be used. A detailed description thereof will be given below.

FIG. 6 is a view showing an example of (X×Y)-sized extended pixel array data.

The image signal processor 110 outputs the (X×Y)-sized extended pixel array data in which pixel values are arranged in the respective pixel areas so that the (X×Y)-sized extended pixel array data can be displayed on the display unit 107 (not shown in FIG. 2). It is apparent to those skilled in the art that the above-mentioned construction is applicable to a pre-view function in picture-taking.

If a data format outputted from the image signal processor 110 is different from a data format supported by the display unit 107, the format-conversion unit 105 can convert the data format outputted from the image signal processor 110. It is apparent to those skilled in the art that the output data of the image signal processor 110 is transmitted to the format-conversion unit when format conversion is needed. Accordingly, a process in which the image signal processor 110 outputs the (X×Y)-sized extended pixel array data so that it can be displayed on the display unit includes a format conversion process in the format-conversion unit 105.

As described above, the mobile communication terminal equipped with a camera function according to the present invention physically generates the (X×Y)-sized extended pixel array data instead of the (x×y)-sized pixel array data in a data storage area, writes corresponding pixel values of the (x×y)-sized pixel array data in individual pixel areas of the (X×Y)-sized extended pixel array data, and processes (i.e., displays on a display, encodes, transmits to an external device, etc.) the (X×Y)-sized extended pixel array data in which pixel values are arranged in corresponding pixel areas.

In addition, the present invention is characterized in that an image encoder 109 for use in the mobile communication terminal according to the present invention encodes the (X×Y)-sized extended pixel array data in which pixel values are arranged in the respective pixel areas (step 207), and an external communication port ill outputs the encoded (X×Y)-sized extended pixel array data to an external device (step 209).

The image encoder 109 encodes the digitally signal processed camera image data in a predetermined format. The image encoder 109 may be implemented with a well-known multimedia chip capable of encoding/decoding still images (e.g., JPEG images) and moving images (e.g., MPEG images). This multimedia chip may be configured to perform the above-mentioned format-conversion function (e.g., YUV→RGB).

The external communication port 111 communicating with the external device (e.g., PC) is well known in the art. Examples of the external communication port 111 include a USB communication port and a UART communication port.

Accordingly, the external communication port 111 is able to transmit the physically generated (X×Y)-sized extended pixel array data to the external device, thereby enlarging desired images without having decreased resolution or causing the deterioration in image quality.

Preferably, the image signal processor 110 performs well-known digital signal processing operations on the (X×Y)-sized extended pixel array data to adjust white balance, adjust auto-focus, recover dead pixels, and the like.

Preferably, the image signal processor 110 performs the above-mentioned well-known digital signal processing operations on the (x×y)-sized pixel array data received from the image sensor 103, and then generates the (X×Y)-sized extended pixel array data.

According to the above-mentioned features, the physically generated (X×Y)-sized extended pixel array data is efficiently combined with the above-mentioned well-known digital signal processing operations, thereby processing the generated image more efficiently.

In addition, the present invention is characterized in that, in a case where the image signal processor 110 arranges corresponding pixel values in the remaining pixel areas (assuming that n is 2), when (x×y)-sized pixel values are arranged to be vertically adjacent to each of corresponding pixel areas contained in the remaining pixel areas, a mean value of the two vertically adjacent pixel values is arranged in each of the corresponding pixel areas; when (x×y)-sized pixel values are arranged to be horizontally adjacent to each of corresponding pixel areas contained in the remaining pixel areas, a mean value of the two horizontally adjacent pixel values is arranged in each of the corresponding pixel areas; and when (x×y)-sized pixel values are arranged in four directions (i.e., upper-left side, lower-left side, upper-right side, and lower-right side) to be adjacent to each of corresponding pixel areas contained in the remaining pixel areas, a mean value obtained by dividing by 4 the sum of a mean value of upper-left and upper-right (x×y)-sized pixel values, a mean value of upper-left and lower-left (x×y)-sized pixel values, a mean value of lower-left and lower-right (x×y)-sized pixel values, and a mean value of lower-right and upper-right (x×y)-sized pixel values is arranged in each of the corresponding pixel areas.

If n is equal to 2, the relation between x and X is defined by x×2=X, and the relation between y and Y is defined by y×2=Y.

The image signal processor 110 arranges individual pixel values of the (x×y)-sized pixel array data received from the image sensor 103 (step 201) in the (X×Y)-sized extended pixel array data area (step 203). In this case, the image signal processor 110 arranges the pixel values of the (x×y)-sized pixel array data to be spaced apart from each other by a pixel size of (n−1) (step 203). In the example of FIG. 4, since n is equal to 2, dummy pixel areas are arranged so that individual pixel areas in which pixel values are arranged can be spaced apart from each other by a pixel size of a single pixel area.

The image signal processor 110 arranges corresponding pixel values in the remaining pixel areas (of the (X×Y)-sized extended pixel array data) other than the pixel areas of the (X×Y)-sized extended pixel array data in which the above-mentioned (x×y)-sized pixel values are arranged.

When (x×y)-sized pixel values (refer to pixel areas A0, A1, B0, and B1 in "A" area in FIG. 4) are arranged to be vertically adjacent to corresponding pixel areas (refer to pixel areas A0' and B0' in "B" area in FIG. 5) contained in the above-mentioned remaining pixel areas, the image signal processor 110 arranges mean values of upper pixel values (i.e., A0 and B0) and lower pixel values (i.e., A1 and B1) in the pixel areas A0' and B0', respectively. Consequently, a pixel value of (A0+A1)/2 is arranged in the A0' pixel area, and a pixel value of (B0+B1)/2 is arranged in the B0' pixel area.

When (x×y)-sized pixel values (refer to pixel areas A0, B0, A1, and B1 in "A" area in FIG. 4) are arranged to be horizontally adjacent to corresponding pixel areas (refer to pixel areas a0' and a1' in "B" area in FIG. 5) contained in the above-mentioned remaining pixel areas, the image signal processor 110 arranges mean values of left pixel values (i.e., A0 and B1) and right pixel values (i.e., B0 and B1) in the pixel areas a0' and a1', respectively. Consequently, a pixel value of (A0+B0)/2 is arranged in the a0' pixel area, and another pixel value of (A1+B1)/2 is arranged in the a1' pixel area.

When (x×y)-sized pixel values (refer to pixel areas A0, B0, A1, and B1 in "A" area in FIG. 4) are arranged in four directions (refer to an upper-left side denoted by A0, a lower-left side denoted by A1, an upper-right side denoted by B0, and a lower-right side denoted by B1) to be adjacent to corresponding pixel area (refer to A0" pixel area in the "B" area in FIG. 5) contained in the above-mentioned remaining pixel areas, the image signal processor 110 arranges a mean value (i.e., (a0'+A0'+B0'+a1')/4) obtained by dividing by 4 the sum of a mean value (i.e., (A0+B0)/2) of the upper-left (x×y)-sized pixel value (i.e., A0) and the upper-right (x×y)-sized pixel value (i.e., B0), a mean value (i.e., (A0+A1)/2) of the upper-left (x×y)-sized pixel value (i.e., A0) and the lower-left (x×y)-sized pixel value (i.e., A1), a mean value (i.e., (A1+B1)/2) of the lower-left (x×y)-sized pixel value (i.e., A1) and the lower-right (x×y)-sized pixel value (i.e., B1), and a mean value (i.e., (B1+B0)/2) of the lower-right (x×y)-sized pixel value (i.e., B1) and the upper-right (x×y)-sized pixel value (i.e., B0) in the A0" pixel area.

Accordingly, the present invention can provide a method of generating the (X×Y)-sized extended pixel array data from the (x×y)-sized pixel array data received from the image sensor having a fixed pixel capacity. In the case of the above-mentioned embodiment, the pixel capacity has been increased four times without having decreased resolution or causing the deterioration in image quality. In particular, in the case of a mobile communication terminal employing the above-mentioned method, a PC can enlarge images outputted from the mobile communication terminal at least four times, store the enlarged images therein, and display the stored images.

As apparent from the above description, the mobile communication terminal equipped with a camera function according to the present invention physically generates the (X×Y)-sized extended pixel array data instead of (x×y)-sized pixel array data in a data storage area, writes corresponding pixel values of the (x×y)-sized pixel array data in individual pixel areas of the (X×Y)-sized extended pixel array data, and processes (i.e., displays on a display, encodes, transmits to an external device, etc.) the (X×Y)-sized extended pixel array data in which pixel values are arranged in corresponding pixel areas.

In addition, since the physically generated (X×Y)-sized extended pixel array data is transmitted to an external device, desired images can be enlarged without having decreased resolution or causing the deterioration in image quality.

Further, the present invention can provide a method of generating the (X×Y)-sized extended pixel array data from the (x×y)-sized pixel array data received from the image sensor having a fixed pixel capacity. In the case of the above-mentioned embodiment, the pixel capacity has been increased four times without having decreased resolution or causing the deterioration in image quality. In particular, in the case of a mobile communication terminal employing the above-mentioned method, a PC can enlarge images outputted from the mobile communication terminal at least four times, store the enlarged images therein, and display the stored images.

Further, the physically generated (X×Y)-sized extended pixel array data is efficiently combined with the above-mentioned well-known digital signal processing operations, thereby processing the generated image more efficiently.

While the present invention has been described with reference to exemplary embodiments thereof, it will be understood by those skilled in the art that various changes in form and details may be made therein without departing from the scope of the present invention as defined by the following claims.

What is claimed is:

1. A device for processing pixel array data in a mobile terminal equipped with a digital camera function, the device comprising:
    an image sensor having (x×y)-sized pixel capacity, the image sensor to convert an optical signal received via a lens into an electric signal, and to generate (x×y)-sized pixel array data, where x is a total number of pixel columns of the image sensor, and y is a total number of pixel rows of the image sensor; and
    an image signal processor to generate an (X×Y)-sized extended pixel array data area in a data storage area satisfying a predetermined condition of x×n=X and y×n=Y (where n=natural number greater than 1), to receive individual pixel values of the (x×y)-sized pixel array data from the image sensor, to arrange all the pixel values of the (x×y)-sized pixel array data in the (X×Y)-sized extended pixel array data area in the data storage area to be spaced apart from each other by a pixel size of (n−1), to arrange corresponding pixel values obtained by performing an arithmetical operation on corresponding pixel values of (x×y)-sized pixel array data, which are adjacent to remaining pixel areas of the (X×Y)-sized extended pixel array data in the data storage area other than the pixel areas having the pixel values of the (x×y)-sized pixel array data, in the remaining pixel areas, and to output the (X×Y)-sized extended pixel array data in which the pixel values are arranged in the respective pixel areas so that the (X×Y)-sized extended pixel array data can be displayed.

2. The device of claim 1, wherein the mobile terminal equipped with a digital camera function is a mobile communication terminal.

3. The device of claim 1, wherein the mobile terminal equipped with a digital camera function is a digital camera.

4. The device of claim 1, further comprising:
    an image encoder to encode the (X×Y)-sized extended pixel array data in which corresponding pixel values are arranged in the pixel areas; and
    an external communication port to transmit the encoded (X×Y)-sized extended pixel array data to an external device.

5. The device of claim 1, wherein the image signal processor performs digital signal processing operations including at least one of white balance adjusting, auto-focus adjusting, and dead pixel recovering operations on the (X×Y)-sized extended pixel array data in which pixel values are arranged in the pixel areas.

6. The device of claim 1, wherein the image signal processor receives the (x×y)-sized pixel array data from the image sensor, performs digital signal processing operations including at least one of white balance adjusting, auto-focus adjusting, and dead pixel recovering operations on the received (x×y)-sized pixel array data, and performs the arranging and outputting operations.

7. The device of claim 1, wherein the image signal processor differently arranges pixel values in the remaining pixel areas according to the following three cases when the value of n is 2, wherein
    in the first case where (x×y)-sized pixel values are arranged to be vertically adjacent to each of corresponding pixel areas contained in the remaining pixel areas, a mean value of the two vertically adjacent pixel values is arranged in each of the corresponding pixel areas;
    in the second case where (x×y)-sized pixel values are arranged to be horizontally adjacent to each of corresponding pixel areas contained in the remaining pixel areas, a mean value of the two horizontally adjacent pixel values is arranged in each of the corresponding pixel areas; and
    in the third case where (x×y)-sized pixel values are arranged in four directions (i.e., upper-left side, lower-left side, upper-right side, and lower-right side) to be adjacent to a corresponding pixel area contained in the remaining pixel areas, a mean value obtained by dividing by 4 the sum of a mean value of upper-left and upper-right (x×y)-sized pixel values, a mean value of upper-left and lower-left (x×y)-sized pixel values, a mean value of lower-left and lower-right (x×y)-sized pixel values, and a mean value of lower-right and upper-right (x×y)-sized pixel values is arranged in the corresponding pixel area.

8. A method of processing pixel array data in a mobile terminal equipped with a digital camera function, the method comprising the steps of:
    a) generating, by an image signal processor, an (X×Y)-sized extended pixel array data area in a data storage area satisfying a predetermined condition of x×n=X and y×n=Y (where n=natural number greater than 1), receiving individual pixel values of an (x×y)-sized pixel array data from an image sensor, arranging all the pixel values of the (x×y)-sized pixel array data in the (X×Y)-sized extended pixel array data area in the data storage area to be spaced apart from each other by a pixel size of (n−1), where x is a total number of pixel columns of the image sensor, and y is a total number of pixel rows of the image sensor;
b) arranging, by the image signal processor, corresponding pixel values obtained by performing an arithmetical operation on corresponding pixel values of (x×y)-sized pixel array data, which are adjacent to remaining pixel areas of the (X×Y)-sized extended pixel array data in the data storage area other than the pixel areas having the pixel values of the (x×y)-sized pixel array data, in the remaining pixel areas; and
c) outputting, by the image signal processor, the (X×Y)-sized extended pixel array data in which the pixel values are arranged in the respective pixel areas so that the (X×Y)-sized extended pixel array data can be displayed.

9. The method of claim 8, wherein the mobile terminal equipped with a digital camera function is a mobile communication terminal.

10. The method of claim 8, wherein the mobile terminal equipped with a digital camera function is a digital camera.

11. The method of claim 8, further comprising the steps of:
encoding, by an image encoder, the (X×Y)-sized extended pixel array data in which corresponding pixel values are arranged in the pixel areas; and
transmitting, by an external communication port, the encoded (X×Y)-sized extended pixel array data to an external device.

12. The method of claim 8, wherein the step (b) includes differently arranging, by the image signal processor, pixel values in the remaining pixel areas according to the following three cases when the value of n is 2, wherein
in the first case where (x×y)-sized pixel values are arranged to be vertically adjacent to each of corresponding pixel areas contained in the remaining pixel areas, a mean value of the two vertically adjacent pixel values is arranged in each of the corresponding pixel areas;
in the second case where (x×y)-sized pixel values are arranged to be horizontally adjacent to each of corresponding pixel areas contained in the remaining pixel areas, a mean value of the two horizontally adjacent pixel values is arranged in each of the corresponding pixel areas; and
in the third case where (x×y)-sized pixel values are arranged in four directions (i.e., upper-left side, lower-left side, upper-right side, and lower-right side) to be adjacent to a corresponding pixel area contained in the remaining pixel areas, a mean value obtained by dividing by 4 the sum of a mean value of upper-left and upper-right (x×y)-sized pixel values, a mean value of upper-left and lower-left (x×y)-sized pixel values, a mean value of lower-left and lower-right (x×y)-sized pixel values, and a mean value of lower-right and upper-right (x×y)-sized pixel values is arranged in the corresponding pixel area.

13. The method of claim 8, further comprising the step of:
performing, by the image signal processor, digital signal processing operations including at least one of white balance adjusting, auto-focus adjusting, and dead pixel recovering operations on the (X×Y)-sized extended pixel array data in which pixel values are arranged in the pixel areas.

14. The method of claim 8, further comprising the steps of:
receiving, by the image signal processor, the (x×y)-sized pixel array data from the image sensor, and performing digital signal processing operations including at least one of white balance adjusting, auto-focus adjusting, and dead pixel recovering operations on the received (x×y)-sized pixel array data; and
performing the arranging and outputting operations.

* * * * *